United States Patent
Rivers et al.

(10) Patent No.: US 10,946,601 B2
(45) Date of Patent: Mar. 16, 2021

(54) METHOD OF FORMING NON-PNEUMATIC TIRE USING SUPPORT STRUCTURE DEFORMATION

(71) Applicants: Compagnie Generale des Etablissements Michelin, Clermont-Ferrand (FR); Eric Rivers, Greenville, SC (US); Brian Wilson, Greer, SC (US)

(72) Inventors: Eric Rivers, Greenville, SC (US); Brian Wilson, Greer, SC (US)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 288 days.

(21) Appl. No.: 16/066,830

(22) PCT Filed: Nov. 3, 2016

(86) PCT No.: PCT/US2016/060360
§ 371 (c)(1),
(2) Date: Jun. 28, 2018

(87) PCT Pub. No.: WO2017/116557
PCT Pub. Date: Jul. 6, 2017

(65) Prior Publication Data
US 2019/0047328 A1      Feb. 14, 2019

Related U.S. Application Data

(63) Continuation of application No. PCT/US2015/067619, filed on Dec. 28, 2015.

(51) Int. Cl.
*B29D 30/02* (2006.01)
*B60C 7/22* (2006.01)
(Continued)

(52) U.S. Cl.
CPC ........ *B29D 30/02* (2013.01); *B29L 2030/006* (2013.01); *B60C 7/14* (2013.01); *B60C 7/22* (2013.01)

(58) Field of Classification Search
CPC .... B60C 7/00; B60C 7/14; B60C 7/22; B60C 2007/146; B29D 30/00; B29D 30/02;
(Continued)

(56) References Cited

U.S. PATENT DOCUMENTS 1,086,333 A    2/1914   Russell
5,685,926 A    11/1997  Vredestein
(Continued)

FOREIGN PATENT DOCUMENTS

CN    101668646 A    3/2010
CN    201506207 U    6/2010
(Continued)

OTHER PUBLICATIONS

Hikoji Yamamoto, JP-2012091555-A, updated machine translation. (Year: 2012).*
(Continued)

*Primary Examiner* — Robert C Dye
*Assistant Examiner* — Sedef E Paquette
(74) *Attorney, Agent, or Firm* — Neal P. Pierotti

(57) ABSTRACT

A method of forming a non-pneumatic tire is provided that includes the steps of providing an outer shear band ring (56) and an intermediate section (14) that has a supporting structure (16). The intermediate section (14) is collapsed from an uncollapsed state to a collapsed state. The intermediate section in the collapsed state is inserted inside of the outer shear band ring such that the outer shear band ring is located outward from the intermediate section in a radial direction of the tire. Compression of the intermediate section (14) is released when the intermediate section (14) is inside
(Continued)

of the outer shear band ring (56) so that the intermediate section returns to the uncollapsed state from the collapsed state. In one embodiment, the compressing step of the intermediate section (14) is performed by a compression device (68) that has a plurality of gripping members.

17 Claims, 9 Drawing Sheets

(51) Int. Cl.
 *B60C 7/14* (2006.01)
 *B29L 30/00* (2006.01)

(58) Field of Classification Search
 CPC ........ B29D 30/2607; B29D 2030/2692; B60B 9/04; B60B 9/10; B60B 9/26; B60B 3/001; B60B 2320/12; B29L 2030/006
 USPC .................................. 156/112, 404; 152/303
 See application file for complete search history.

(56) References Cited

U.S. PATENT DOCUMENTS

| | | |
|---|---|---|
| 6,286,572 B1 | 9/2001 | Bredestein |
| 7,013,939 B2 | 3/2006 | Rhyne |
| 2001/0030402 A1 | 10/2001 | White |
| 2003/0024383 A1* | 2/2003 | Roberts .................. F15B 15/02 92/120 |
| 2007/0089820 A1 | 4/2007 | Gabrys et al. |
| 2008/0314486 A1 | 12/2008 | Manesh et al. |
| 2009/0211675 A1* | 8/2009 | Louden .................... B60B 9/02 152/55 |
| 2010/0018621 A1* | 1/2010 | Thompsom ............... B60C 7/22 152/302 |
| 2010/0200131 A1 | 8/2010 | Iwase |
| 2011/0248554 A1 | 10/2011 | Chon |
| 2012/0205017 A1 | 8/2012 | Endicott |
| 2012/0318458 A1 | 12/2012 | Araki |
| 2015/0273946 A1 | 1/2015 | Abe |
| 2015/0174953 A1 | 6/2015 | Cron |
| 2015/0251493 A1 | 9/2015 | Ma |
| 2016/0016426 A1 | 1/2016 | Endicott |
| 2016/0167434 A1 | 6/2016 | Nishida |
| 2017/0113491 A1* | 4/2017 | Iwamura ................... B60C 7/18 |

FOREIGN PATENT DOCUMENTS

| | | |
|---|---|---|
| DE | 702808 C | 1/1940 |
| DE | 20000034 U1 | 4/2000 |
| FR | 334354 A | 12/1903 |
| GB | 191410998 A | 11/1914 |
| GB | 978913 A | 1/1965 |
| GB | 2431383 A | 4/2007 |
| GB | 2481137 A | 12/2011 |
| JP | 4370599 B2 | 11/2009 |
| JP | 2012091555 A | 5/2012 |
| JP | 2012121559 A | 6/2012 |
| WO | 2005039865 A1 | 6/2005 |
| WO | 2017106704 A2 | 6/2017 |

OTHER PUBLICATIONS

European Patent Office; International Search Report and Written Opinion for patent application PCT/US2015/067619; dated Sep. 22, 2016; Publisher: European Patent Office, Rijswijk, Netherlands, pp. 1-11, enclosed.

European Patent Office; International Search Report and Written Opinion for patent application PCT/US2016/060360; dated Feb. 2, 2017; Publisher: European Patent Office, Rijswijk, Netherlands, pp. 1-11, enclosed.

* cited by examiner

METHOD OF FORMING NON-PNEUMATIC TIRE USING SUPPORT STRUCTURE DEFORMATION

CROSS-REFERENCE TO RELATED APPLICATIONS

The present application is a 35 U.S.C. § 371 application of PCT/US16/60360 filed on Nov. 3, 2016 and entitled "Method of Forming Non-Pneumatic Tire Using Support Structure Deformation." PCT/US16/60360 claims the benefit of PCT/US15/67619 filed on Dec. 28, 2015 and entitled "Method of Forming Non-Pneumatic Tire Using Support Structure Deformation." PCT/US16/60360 and PCT/US15/67619 are both incorporated by reference herein in their entireties for all purposes.

FIELD OF THE INVENTION

The present invention relates generally to a method of constructing a non-pneumatic tire from a series of subsections. More particularly, the present application involves a method of constructing a non-pneumatic tire that includes the step of deforming a support structure in order to assemble an intermediate section with an outer shear band ring.

BACKGROUND

Non-pneumatic tires for vehicles and other applications are known that may include a hub surrounded circumferentially by an outward radially disposed tread that includes an annular shear band ring. A supporting structure that may have a series of spokes can be disposed radially between the hub and shear band ring and can function to connect these two components. As the tire rotates under load, the spokes experience bending, extension and compression deformation when they are located downward near the contact patch of the tire. The spokes straighten outside the contact patch relieving the bending and compression deformation.

The formation of the non-pneumatic tire may involve the insertion of the shear band ring into a mold and then overmolding the supporting structure onto the interior of the shear band ring through injection molding. However, this will generate a large amount of pressure onto the shear band ring causing distortion and damage thereto. Further, injection molding of the supporting structure across the entire axial length of the non-pneumatic tire may be difficult in that material will not easily flow along the entire axial length during this process. Further, thin mold sections between features of the supporting structure, such as spokes, may be damaged by pressure variations in the manufacturing process.

Another method of formation involves the formation of the supporting structure and then subsequent attachment to the shear band ring. Features of the supporting structure such as spokes could be slid into sections of the shear band ring. Attachment through adhesives requires precise control of critical parameters such as temperature, humidity, coating thickness, application pressure, and clamping time. Further, such attachment requires very precise and expensive fixtures to properly locate features of the supporting structure, such as spokes, with respect to the shear band ring. Still further, the use of adhesives in the manufacturing process may cause fouling of the tooling and equipment by the adhesive itself. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
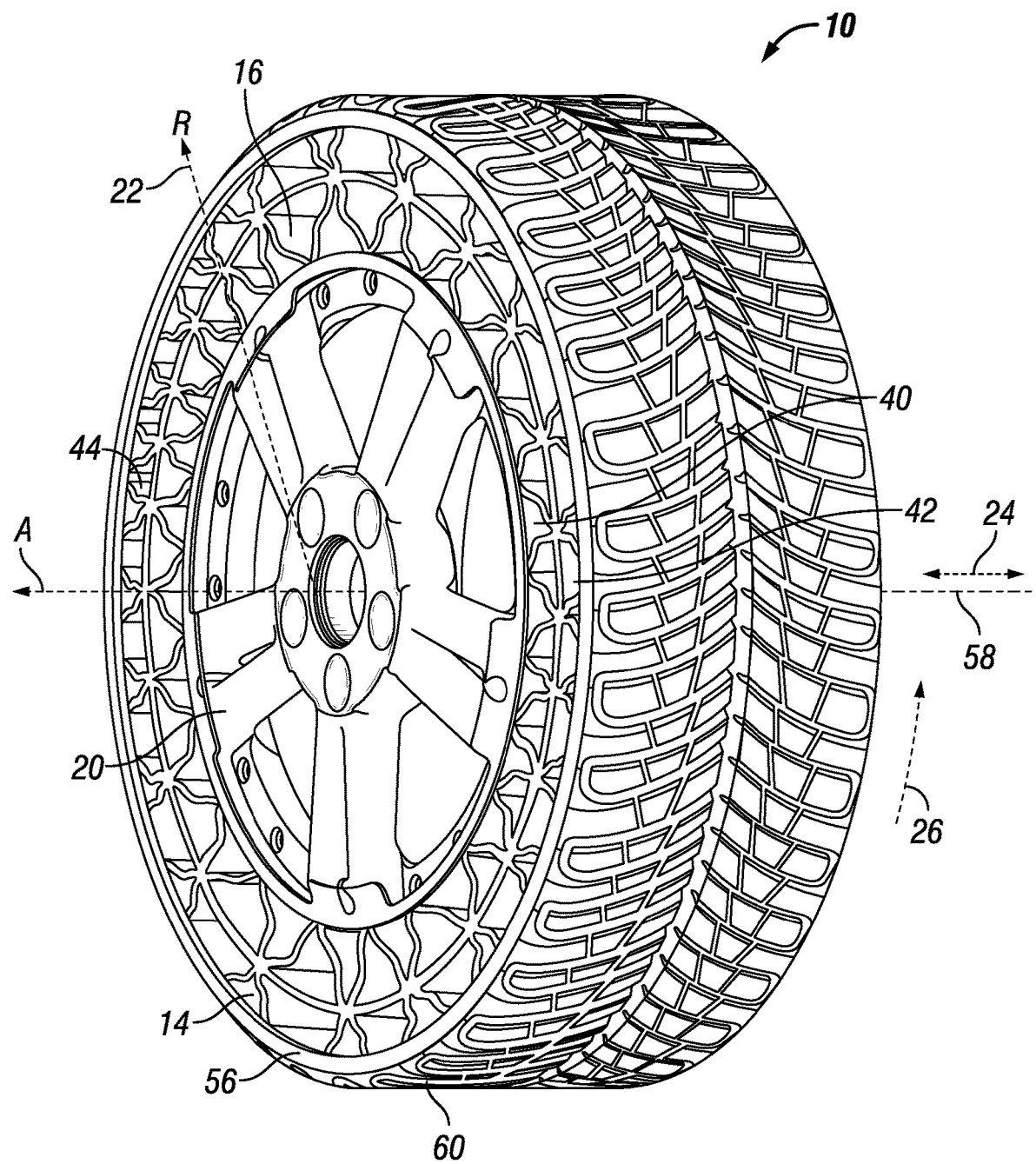
FIG. 1 is a perspective view of a non-pneumatic tire.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a method of forming a non-pneumatic tire 10 that includes a hub 20, a supporting structure 16, and a shear band ring 56. The method involves the construction of a plurality of intermediate sections 14 that could each have an inner shear band ring 18. The intermediate sections 14 can be collapsed and then inserted into an outer shear band ring 12. The compression can be released in order to allow the inner shear band ring 12 to return to its uncollapsed state 62. The intermediate sections 14 may be attached to the outer shear band ring 12, and a hub 20 may be subsequently attached to complete the assembly. The intermediate sections 14 may include a supporting structure 16 that can be configured in a variety of manners. In some embodiments, the intermediate sections 14 may be made up of a supporting structure 16 that includes an inner V pair spoke section 40, an interface ring 42, and an outer V pair spoke section 44.

With reference to FIG. 1, a non-pneumatic tire 10 is shown through which a central axis 58 extends. The central axis 58 is identified with other components of the non-pneumatic tire 10 and compression device 68 and relates to the position of these components once assembled into the non-pneumatic tire 10 and devices as used to assembly the non-pneumatic tire 10 into the assembled position. The other directions identified herein, such as the radial direction 22, axial direction 24, and the circumferential direction 26, likewise relate to the position of the non-pneumatic tire 10 and its components when assembled, along with the devices used to construct the non-pneumatic tire 10 upon assembly of the non-pneumatic tire 10. An axial direction 24 is defined as the direction along the central axis 58 or the direction parallel to the central axis 58. The radial direction 22 extends at a 90 degree angle to the axial direction 24, and the circumferential direction 26 extends around the arc length of the non-pneumatic tire 10, or its components, so as to circle 360 degrees the central axis 58. The axial direction 24, the radial direction 22 and the circumferential direction 26 are identified with other components in the drawings that are then subsequently assembled into the non-pneumatic tire 10 as their orientations would be upon assembly. The non-pneumatic tire 10 includes a hub 20 that can be mounted onto a wheel of the vehicle. The central axis 58 extends through the center of the hub 20.

Located outward from the hub 20 in the radial direction 22 is a supporting structure 16. The supporting structure 16 may be designed in a variety of manners. As shown, the supporting structure 16 includes an inner V pair spoke section 40, an interface ring 42, and an outer V pair spoke section 44. The spokes are V shaped with apexes that are oriented to and are located at one another between the inner and outer V pair spoke sections 40 and 44. However, it is to be understood that the supporting structure 16 can be provided in a variety of manners and need not include V shaped spokes, and need not include inner 40 and outer 44 sections in other embodiments. Instead, the supporting structure 16 may include simply a plurality of spokes that are linear in shape and that are arranged completely around the supporting structure 16 in the circumferential direction 26. As such, it is to be understood that the configuration of the supporting structure 16 illustrated and described is only exemplary and that other arrangements are possible in other configurations of the non-pneumatic tire 10 and method disclosed herein.

The non-pneumatic tire 10 also has a shear band ring 56 that engages the supporting structure 16 and is located radially outward from the supporting structure 16 in the radial direction 22. Tread 60 is also included in the non-pneumatic tire 10 and is attached to the shear band ring 56. The supporting structure 16 may be formed as a single component, or can be made by individually constructing two or three subcomponents and then assembling these two or three modular pieces together to form the supporting structure 16. Construction in two or three modular pieces may allow for benefits in cost and performance to be realized.

Figure 2:
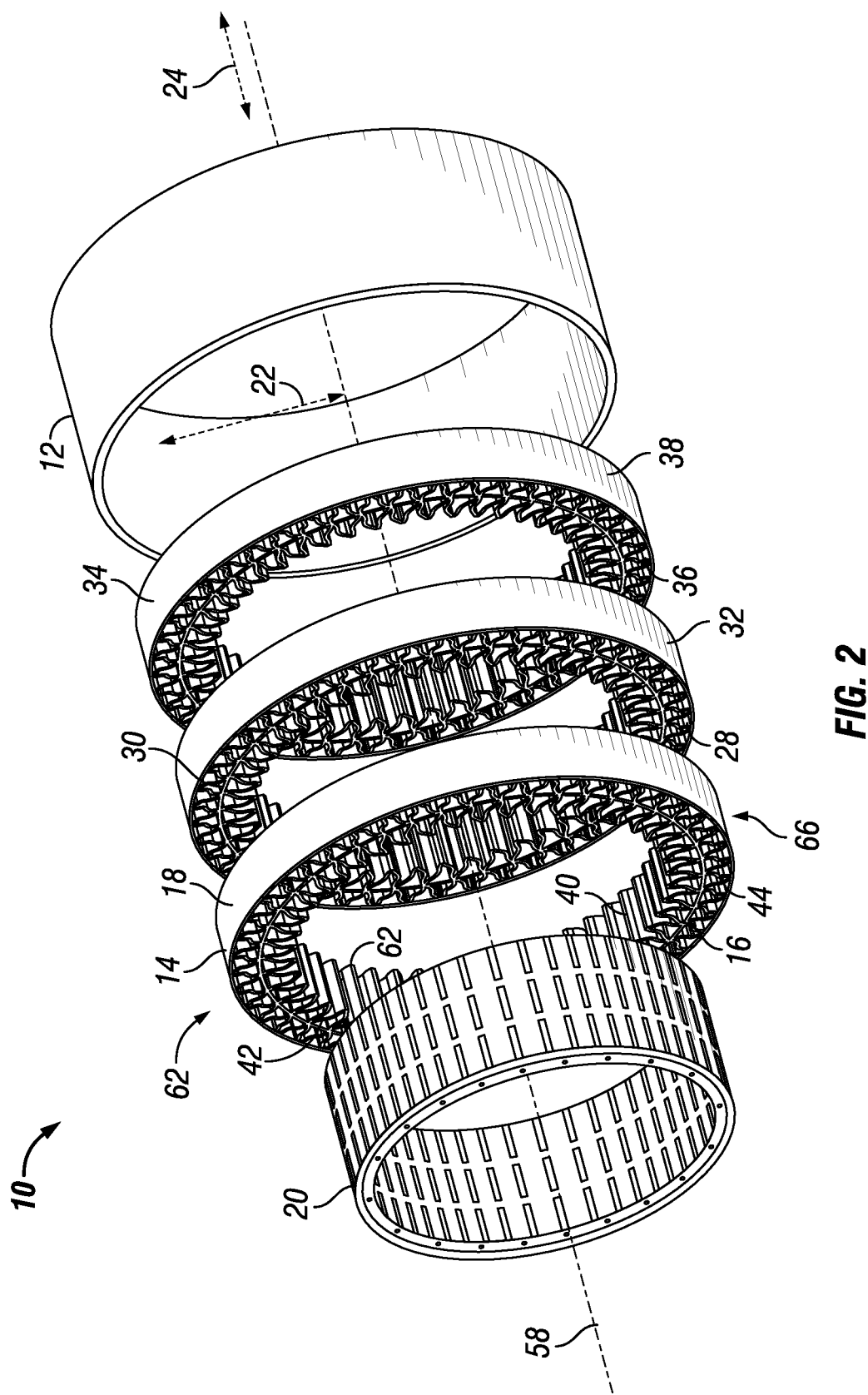
FIG. 2 is a perspective exploded assembly view of a non-pneumatic tire composed of a hub and a series of intermediate sections inserted into an outer shear band ring.

An exploded perspective view of a non-pneumatic tire 10 is shown in FIG. 2. The tire 10 includes a plurality of intermediate sections 14, 28 and 34 that can all be formed in the same manner with the same components. The intermediate sections include supporting structures 16, 30 and 36 that are located inward in the radial direction 22 from corresponding inner shear band rings 18, 32 and 38. The intermediate sections 14, 28 and 34 are positioned into an outer shear band ring 12 so as to lie against one another in the axial direction 24. The shear band ring 56 is thus made up of an outer shear band ring 12 and a number of inner shear band rings 18, 32 and 38 and is not formed as a single component. However, in other versions, the intermediate sections 14, 28 and 34 may lack inner shear band rings 18, 32 and 38 and thus the entire shear band ring 12 is made up of the outer shear band ring 12. In the version shown in FIG. 2, the various spokes of the supporting structures 16, 30, and 36 do not directly engage the outer shear band ring 12 but are instead offset therefrom by the inner shear band rings 18, 32 and 38. A hub 20 is located within and is attached to the intermediate sections 14, 28 and 34.

Figure 3:
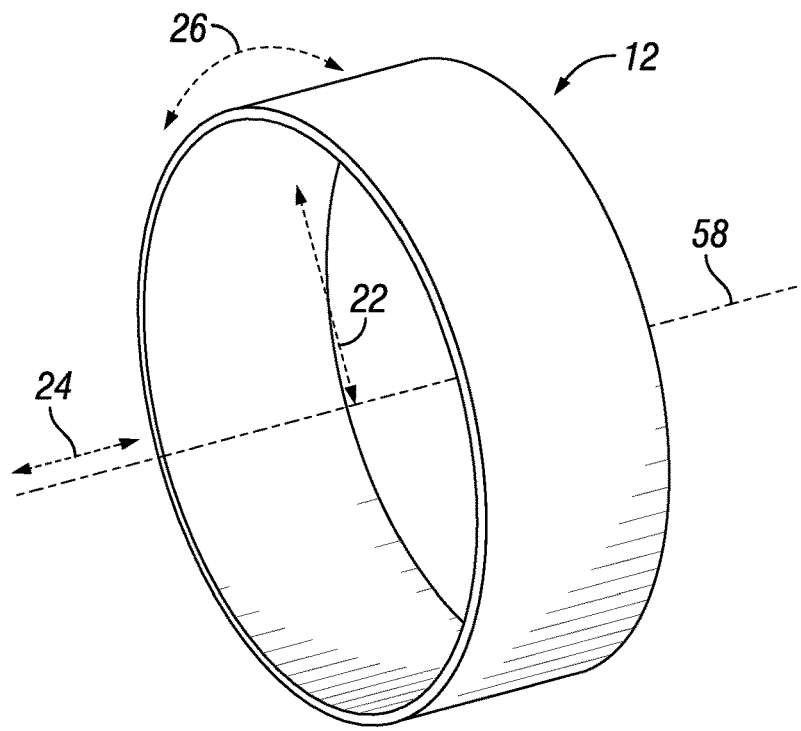
FIG. 3 is a perspective view of an outer shear band ring.
Figure 4:
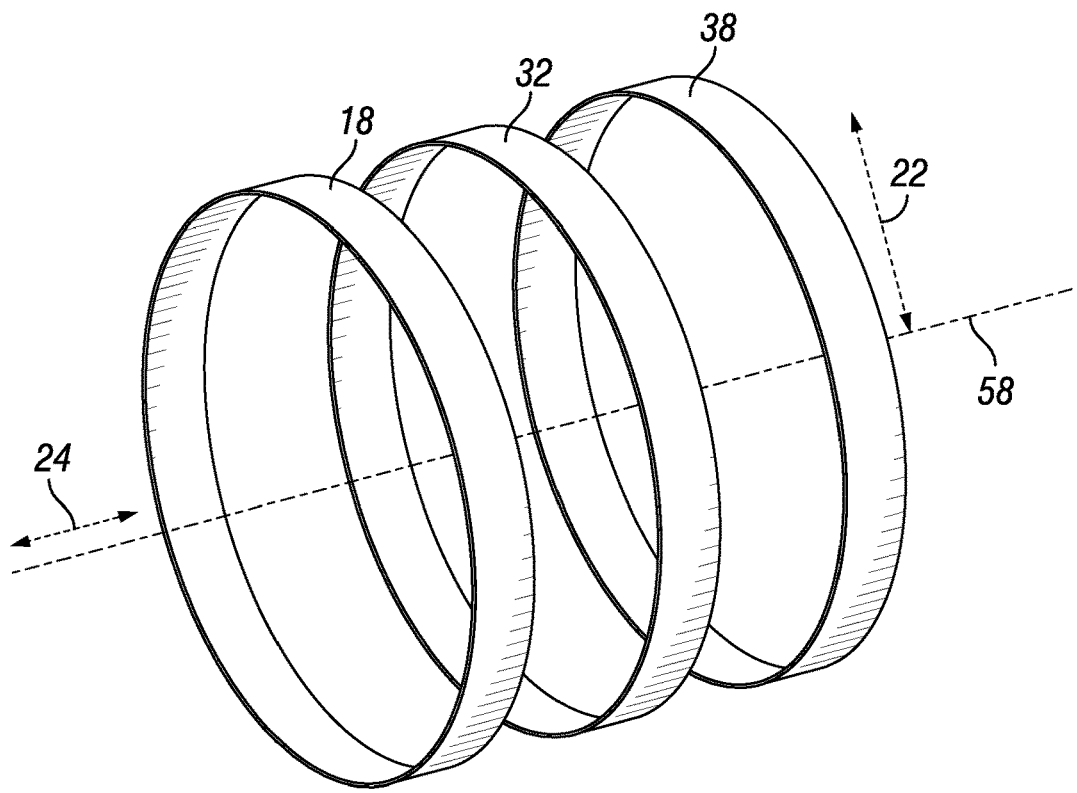
FIG. 4 is a perspective view of a series of inner shear band rings.

The method for forming the non-pneumatic tire 10 may first involve the building and curing of the outer shear band ring 12 and the inner shear band rings 18, 32 and 38. The outer shear band ring 12 is shown in FIG. 3, and three inner shear band rings 18, 32 and 38 are shown in FIG. 4. The number of inner shear band rings 18, 32 and 38 may vary depending upon the width of the outer shear band ring 12 which is the length of the outer shear band ring 12 in the axial direction 24. Any number of inner shear band rings 18, 32 and 38 may be utilized and they may or may not be sized the same in the axial direction 24. The number and size of the inner shear band rings 18, 32 and 38 may be dependent upon molding constraints of other features of the non-pneumatic tire 10 such as the spokes. The outer shear band ring 12 may include any number of layers of the resulting shear band ring 56. Likewise, the inner shear band rings 18, 32 and 38 can include any number of layers of the resulting shear band ring 56. In some embodiments, the inner shear band rings 18, 32 and 38 include two layers of the shear band ring 56. The inner shear band rings 18, 32 and 38 may include an inextensible section that is stiffer (has a higher modulus of rigidity) than other sections of the inner shear band rings 18, 32 and 38 and are stiffer that other components such as the inner V pair spoke section 40, the interface ring 42, the outer V pair spoke section 44, and the outer shear band rings 12. The inextensible section may be capable of buckling. The inner shear band rings 18, 32 and 38 are portions of the shear band ring 56 and are not portions of the spokes and are not rings of the supporting structures, 16, 30 and 36 in that they can include the same materials as other portions of the shear band ring 56 such as the outer shear band ring 12. The number of layers and the thickness in the radial direction 22 of the inner shear band rings 18, 32 and 38 can be selected so that the inner shear band rings 18, 32 and 38 can flex inward some amount in the radial direction 22 so that they can be inserted into the outer shear band ring 12 when the intermediate sections 14, 28 and 34 are inserted.

Figure 5:
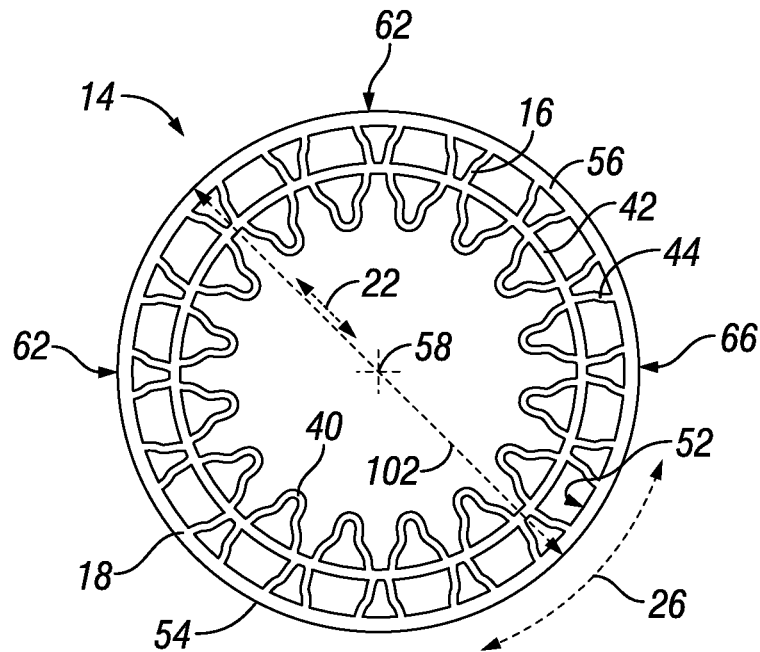
FIG. 5 is a side elevation view of an intermediate section formed by molding a supporting structure into an inner shear band ring.

The next step in the assembly process may be the formation of the intermediate section 14. Once the inner shear band ring 18 is formed, it may be placed as an insert within a mold for the formation of the supporting structure 16. The mold into which the inner shear band ring 18 may be placed can be an injection mold. With reference to FIG. 5, the supporting structure 16 may include an inner V pair spoke section 40, an interface ring 42, and an outer V pair spoke section 44. These sections 40, 42 and 44 can be injection molded and upon their formation by injection molding the outer V pair spoke section 44 can bond directly to the inner surface 52 of the inner shear band ring 18. This type of process is known as overmolding in the injection molding process. The mold that includes the components of the supporting structure 16 such as the inner V pair spoke section 40, interface ring 42, and the outer V pair spoke section 44 may control the precision of location of the attachment of the spokes of the outer V pair spoke section 44 to the inner shear band ring 18 and may eliminate the challenges associated with attaching the spokes to the shearband 56. Such an attachment also minimizes the amount of material needed for attachment of the spokes to the shearband 56. In other versions of the method, the spokes and other structure of the supporting structure is adhered to the inner surface of the inner shear band ring 18 without molding but through the use of adhesives.

The inner surface 52 of the inner shear band ring 18 may be primed by being chemically prepared either by plasma or chemical adhesion promoter. This priming may be done before the injection molding in order to help the outer V pair spoke section 44 better adhere to the inner surface 52 of the inner shear band ring 18.

The components of the supporting structure 16 such as the inner V pair spoke section 40, interface ring 42, and outer V pair spoke section 44 can be made out of thermoplastic elastomers such as thermoplastic urethanes, polyether block amides, copolyester ethers, polyolefin elastomers, and plastomers. In some embodiments, other materials may be used to construct the inner V pair spoke section 40, interface ring 42, and outer V pair spoke section 44 could be more rigid thermoplastic materials such as polyethylene, polypropylene, and nylon. Although described as being molded with or otherwise formed with an inner shear band ring 18, it is to be understood that the intermediate section 14 need not include an inner shear band ring 18 in other embodiments. In some instances, the outer V pair spoke section 44 can include a ring of material to which the V shaped spokes engage, and this ring may be made of the same material as the V shaped spokes. In other instances, the ring may not be present, and the V shaped spokes could terminate at the outer diameter 102 of the intermediate section 14.

The second intermediate section 28 may be constructed in a similar manner as the first intermediate section 14 as previously discussed. In this regard, the components of the second supporting structure 30 such as the outer V pair spoke section of the second supporting structure 30 may be molded onto the inner surface of the second inner shear band ring 32 through an overmolding in the injection molding process. The third intermediate section 34 may likewise be constructed as in a similar manner as the first intermediate section 14 previously discussed. Components of the third supporting structure 36 such as the outer V pair spoke section can be molded onto the inner surface of the third inner shear band ring 38. The inner surfaces of the second and third inner shear band rings 32 and 38 may be prepped in the same manners as the inner surface 52, and the materials making up the second and third intermediate sections 28 and 34 may be the same as the intermediate section 14 as previously discussed and a repeat of this information is not necessary. If additional intermediate sections are needed in other embodiments, they may be provided as previously discussed with respect to the first intermediate section 14. The various intermediate sections 14, 28 and 34 can be configured in a similar manner as one another so that their supporting structures 16, 30, and 36 are identical, or these supporting structures 16, 30 and 36 may differ from one another.

The next step in the assembly process after the construction of the number of intermediate sections 14, 28 and 34 needed is the attachment of the intermediate sections 14, 28 and 34 into the outer shear band ring 12. An adhesive interface 54 may be formed for the attachment of the intermediate sections 14, 28 and 34 to the outer shear band ring 12. The adhesive interface 54 may be a rubber based crosslinking material such as cushion gum that can be applied in a solid/skim or liquid form. Other adhesives used to form the adhesive interface 54 could be polyurethane, cyanoacrylate, or epoxy based glue. The adhesive used may be of any type. The adhesive forming the adhesive interface 54 may be applied to either the inner surface of the outer shear band ring 12, the outer surface of the various inner shear band rings 18, 32 and 38, or to both the outer shear band ring 12 and the inner shear band rings 18, 32 and 38. The adhesive interface 54 is shown applied to the outer surface 66 of the intermediate section 14 in FIG. 5. The outer surface 66 is also the outer surface of the inner shear band ring 18, and the adhesive interface 54 may be applied when the intermediate section 14 is in the uncollapsed state 62.

Once the adhesive is applied, the intermediate section 14 may be collapsed some amount in the radial direction 22. The collapsing may be into any type of shape. This collapsing allows the intermediate section 14 to be inserted into the interior of the outer shear band ring 12 as the exterior diameter of the intermediate section 14 will be less than the inner diameter of the outer shear band ring 12. Once inserted, the intermediate section 14 will be allowed to expand so that the outer surface of the intermediate section 14 engages the interior surface of the outer shear band ring 12. Any type of mechanism may be employed to collapse the intermediate section 14 so as to move the intermediate section 14 from an uncollapsed state 62 to a collapsed state 64. Although described as being "collapsed" the intermediate section 14 may also be thought of as buckling in that certain portions of the outer surface 66 of the intermediate section 14 move toward the central axis 58 in the radial direction 22 a greater amount than other portions of the outer surface 66. Although the reconfiguration of the intermediate section 14 could also be defined as compressing, it is to be understood that the intermediate section 14 does not move from the uncompressed state 62 to the compressed state 64 such that all of the outer surface 66 moves the same amount in the radial direction 22. As used herein, the term collapsed is broad enough to include other terms that describe the modification of the intermediate section such as buckled and compressed.

Figure 6:
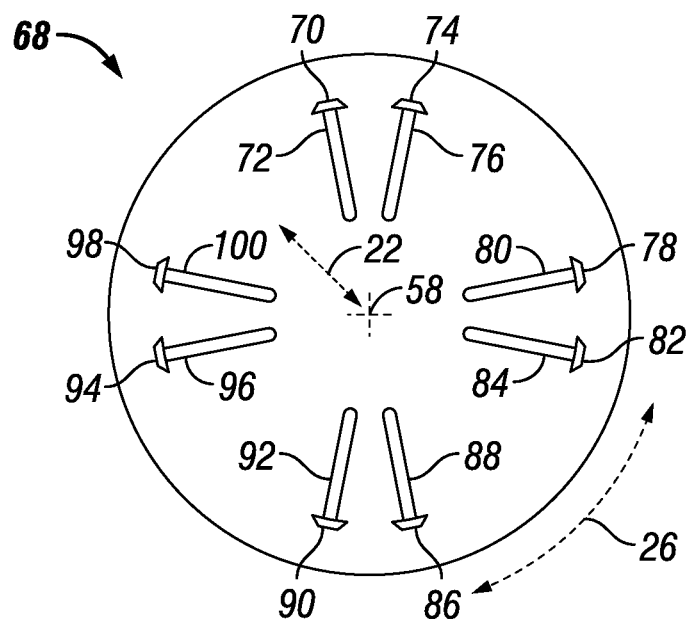
FIG. 6 is a front view of a compression device.

FIG. 6 shows a compression device 68 that can be used to compress the intermediate section 14 to move it from an uncollapsed state 62 to a collapsed state 64. The compression device 68 has a plurality of gripping members 70, 74, 78, 82, 86, 90, 94 and 98 spaced from one another in the circumferential direction 26 and disposed about the central axis 58 at different arc length positions. The various gripping members 70, 74, 78, 82, 86, 90, 94 and 98 may all be located at the same distance from the central axis 58 in the radial direction 22. The gripping members 70, 74, 78, 82, 86, 90, 94 and 98 can all be shaped in the same manner or they may be shaped differently from one another, and may be moveable in the radial direction 22 so as to be capable of moving closer to or further from the central axis 58 in the radial direction 22. The gripping members 70, 74, 78, 82, 86, 90, 94 and 98 can extend outward from a base of the compression device 68. In this regard, the gripping members 70, 74, 78, 82, 86, 90, 94 and 98 may extend in the axial direction 24. The base of the compression device 68 may be circular in shape. The gripping members may be pins, clamps, or any type of member capable of pulling, twisting, urging, or forcing the components of the non-pneumatic tire 10.

Any mechanism may be used to cause the gripping members 70, 74, 78, 82, 86, 90, 94 to move in the radial direction 22. They may all be connected to a common device, such as a lever arm, so as to all move simultaneously in the radial direction 22, or they may be individually moveable in the radial direction 22 such that when one gripping member moves, the other gripping members remain stationary, or may move as well if desired. As such, the movement of the gripping members 70, 74, 78, 82, 86, 90, 94 and 98 can be independent from one another or may be linked to one another. In some instances, certain ones of the gripping members 70, 74, 78, 82, 86, 90, 94 and 98 do not move in the radial direction 22 and are not capable of moving in the radial direction 22. Although eight gripping members 70, 74, 78, 82, 86, 90, 94 and 98 are shown, any number of gripping members 70, 74, 78, 82, 86, 90, 94 and 98 can be used in other exemplary embodiments. For example, from 1-7, from 9-15, from 16-22, or up to 50 gripping members may be present in other designs of the compression device 68.

The gripping members are arranged on the compression device 68 in groups of two so that two of the gripping members 70, 74 are close to one another in the circumferential direction 26. Other groups of two such as gripping members 74 and 82, and gripping members 86 and 90, and gripping members 94 and 98 are likewise oriented close to one another in the circumferential direction 26. The groups of two are symmetrically spaced from one another in the circumferential direction 26. This positioning of the gripping members 70, 74, 78, 82, 86, 90, 94 and 98 is exemplary and it is to be understood that they may be spaced and positioned in any manner in the circumferential direction 26 and may or may not be symmetrical in this regard.

Gripping member 70 is associated with slot 72 and can be moved so as to move along the length of slot 72. This movement allows the gripping member 70 to be variously positioned on the compression device 68 so as to be moved closer to and further from the central axis 58 in the radial direction 22. The slot 72 may be oriented with respect to the central axis 58 so that it extends completely in the radial direction 22 with no extension in the circumferential direction 26. In other embodiments, the slot 72 may be arranged so as to have a component of extension in both the radial direction 22 and the circumferential direction 26. In this regard, the slot 72 will not extend directly at or towards the central axis 58. In yet other arrangements, the slot 72 will extend so as to have no component of extension in the radial direction 22. Here, the slot 72 may be an arc so as to extend only in the circumferential direction 26.

The gripping member 70 can have any cross-sectional shape, and may be of any length in the axial direction 24. As shown, the gripping member 70 has a generally trapezoidal cross-sectional shape but with the side closest to the central axis 58 being concave in shape. The remaining gripping members 74, 78, 82, 86, 90, 94 and 98 can be of any cross-sectional shape and may be the same as the gripping member 70 as previously discussed. Likewise, their lengths in the axial direction 24 can be the same as one another or different from one another if desired.

Each one of the gripping members 70, 74, 78, 82, 86, 90, 94 and 98 is associated with one of the slots 72, 76, 80, 84, 88, 92, 96 and 100 so as to travel along the length of its associated slot. The arrangement of slots 76, 80, 84, 88, 92, 96 and 100 and their respective gripping members can be the same as that previously discussed with respect to gripping member 70 and slot 72 and a repeat of this information is not needed. Further, although described as including the slots 72, 76, 80, 84, 88, 92, 96 and 100, it is to be understood that they need not be present in other versions of the compression device 68 as the compression device 68 can have any element capable of moving so as to in turn impart this movement onto the intermediate section 14.

Figure 7:
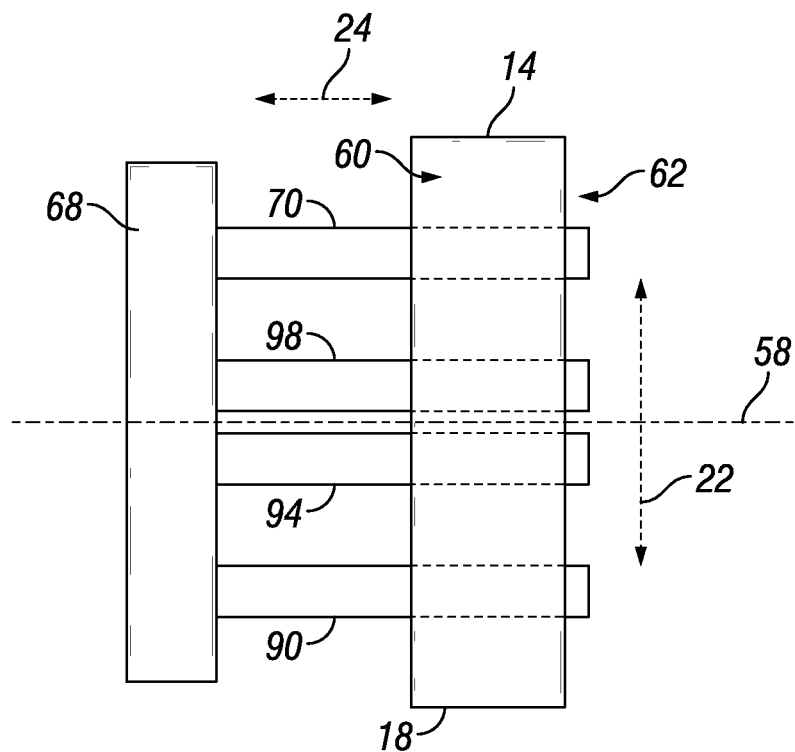
FIG. 7 is a side view of a compression device engaging an intermediate section.

The compression device 68 may be used to hold the intermediate section 14 as shown in FIG. 7. The gripping members 70, 74, 78, 82, 86, 90, 94 and 98 can be inserted into the supporting structure 16 and the supporting structure 16 can be suspended by the gripping members 70, 74, 78, 82, 86, 90, 94 and 98 so as to be held thereon. The gripping members 70, 74, 78, 82, 86, 90, 94 and 98 may have a length in the axial direction 24 that extends completely through the intermediate section 14. Alternatively, the gripping members 70, 74, 78, 82, 86, 90, 94 and 98 can be positioned so that they terminate at some point within the intermediate section 14. The gripping members 70, 74, 78, 82, 86, 90, 94 and 98 may move slightly in the radial direction 22 towards the central axis 58 so as to impart some degree of holding force onto the supporting structure 16 to help hold the supporting structure 16 and thus intermediate section 14 onto the compression device 68. In other embodiments, no force is applied and the supporting structure 16 is simply held thereon. The compression device 68 may be moved to a desired area, or may remain stationary when the intermediate section 14 is held thereon.

Figure 8:
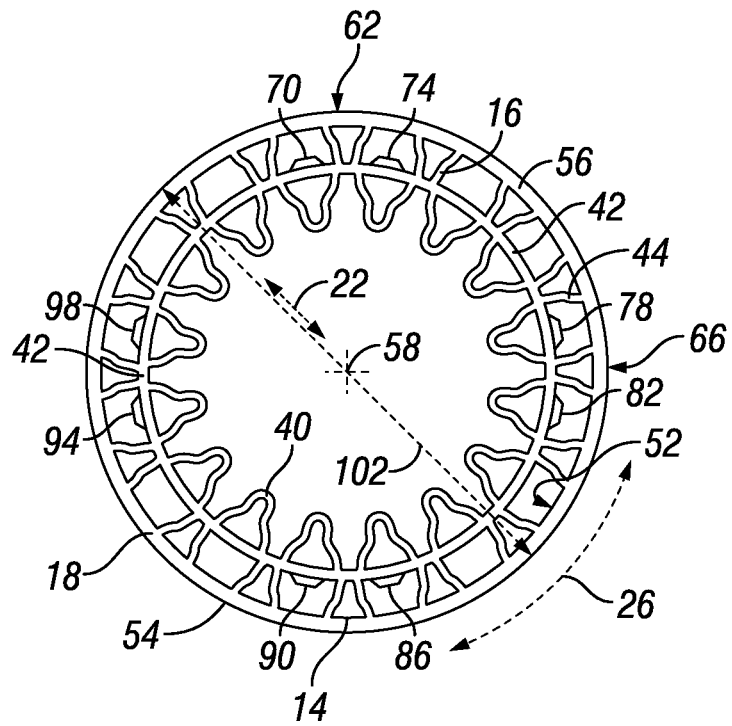
FIG. 8 is a side elevation view of an intermediate section in an uncollapsed state with gripping members from a compression device inserted therein.
Figure 9:
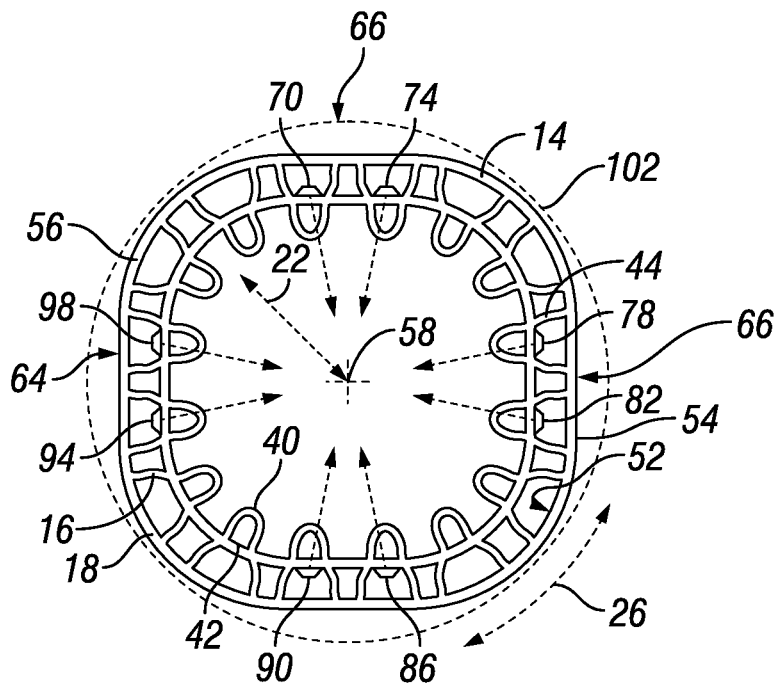
FIG. 9 is a side elevation view of an intermediate section in a collapsed state.

Reference is now made to FIG. 8 in which the intermediate section 14 is in an uncollapsed state 62. The intermediate section 14 has an outer surface 66 that is the outer surface of the inner shear band ring 18. If the inner shear band ring 18 were not present, the intermediate section 14 would still have an outer surface 66 that could be the outer surface of a ring of the outer V pair spoke section 44. If this ring were not present, the outer surface 66 would be portions of the outer V pair spoke section 44 and the outer surface 66 would be discontinuous in the circumferential direction 26. If the supporting structure 16 did not have any V shaped spokes and did not have an outer V pair spoke section 44, the outer surface 66 would be the outer surface of the structure of the supporting structure 16. The outer surface 66 as shown in FIG. 8 coincides with the outer diameter in the uncollapsed state 102 of the intermediate section 14. The outer surface 66 thus has a diameter that is the same as the outer diameter in the uncollapsed state 102. If the outer surface 66 was discontinuous, the outer diameter in the uncollapsed state 102 would coincide with the portion of the discontinuous outer surface 66 that is farthest from the central axis 58 in the radial direction 22.

Gripping member 70 engages the outer surface of the interface ring 42 such that the concave shaped side of the gripping member 70 engages the surface of the interface ring 42 that is farthest from the central axis 58 in the radial direction 22. The gripping member 70 is located within a pocket defined by the interface ring 42, the outer V pair spoke section 44, and the inner shear band ring 18. The other gripping members 74, 78, 82, 86, 90, 94 and 98 are likewise located within pockets defined by the interface ring 42, outer V pair spoke section 44, and inner shear band ring 18 and their concave surfaces engage the interface ring 42 on the portion of the interface ring 42 that is farthest in the radial direction 22 from the central axis 58.

The compression device 68 can be actuated in order to cause the gripping members 70, 74, 78, 82, 86, 90, 94 and 98 to move inward in the radial direction 22 towards the central axis 58. This movement will cause the intermediate section 14 to deform so as to be placed into the collapsed state 64. The entire outer surface 66 of the intermediate section 14 will be located closer to the central axis 58 in the collapsed state 64 than the outer diameter in the uncollapsed state 62. The geometry of the supporting structure 16 may cause the intermediate section 14 to uniformly compress, or the supporting structure 16 may non-uniformly compress so that some portions of the outer surface 66 move closer to the central axis 58 in the radial direction 22 than other portions of the outer surface 66. As the inner shear band ring 18 is attached to the supporting structure 16, it will likewise move in the radial direction 22 when the intermediate section 14 is moved into the collapsed state 64. The outer surface 66 may be uniformly moved during compression, or may be non-uniformly moved during compression so that portions of the outer surface 66 are close to the central axis 58 in the radial direction 22 than other portions of the outer surface 66. The intermediate section 14 can be made so that it is inextensible from the uncollapsed state 62. The outer surface 66 may thus not be capable of expanding or moving away from the central axis 58 in the radial direction 22 when in the uncollapsed state 62.

The gripping members 70, 74, 78, 82, 86, 90, 94 and 98 may all move the same amount in the radial direction 22 to put the intermediate section 14 into the collapsed state 64. Alternatively, some of the gripping members 70, 74, 78, 82, 86, 90, 94 and 98 may move while others remain stationary. This movement will likewise cause compression in the radial direction 22. No portion of the compression device 68 may engage the outer surface 66 during the compression as the outer surface 66 may be treated with the adhesive interface 54 as previously discussed. The arrows associated with the gripping members 70, 74, 78, 82, 86, 90, 94 and 98 illustrate the force applied and the direction of application of the force by them onto the intermediate section 14 for compression. In some embodiments, the force need not be directed at the central axis 58. Here, the geometry of the supporting structure can be set up so that force in a tangent direction with no component towards the central axis 58 may still cause compression in the radial direction 22. Although shown as all being directed towards the center, an unequal amount of force from the gripping members 70, 74, 78, 82, 86, 90, 94 and 98 can be realized so that a greater deformation occurs at certain arc length positions around the outer surface 66 than other arc length positions. Still further, the direction of force applied by the gripping members 70, 74, 78, 82, 86, 90, 94 and 98 need not be uniform so that some of them apply force in different directions with respect to the central axis 58 so that some are directly towards the central axis 58 while others are indirectly pointed at the central axis 58.

Figure 10:
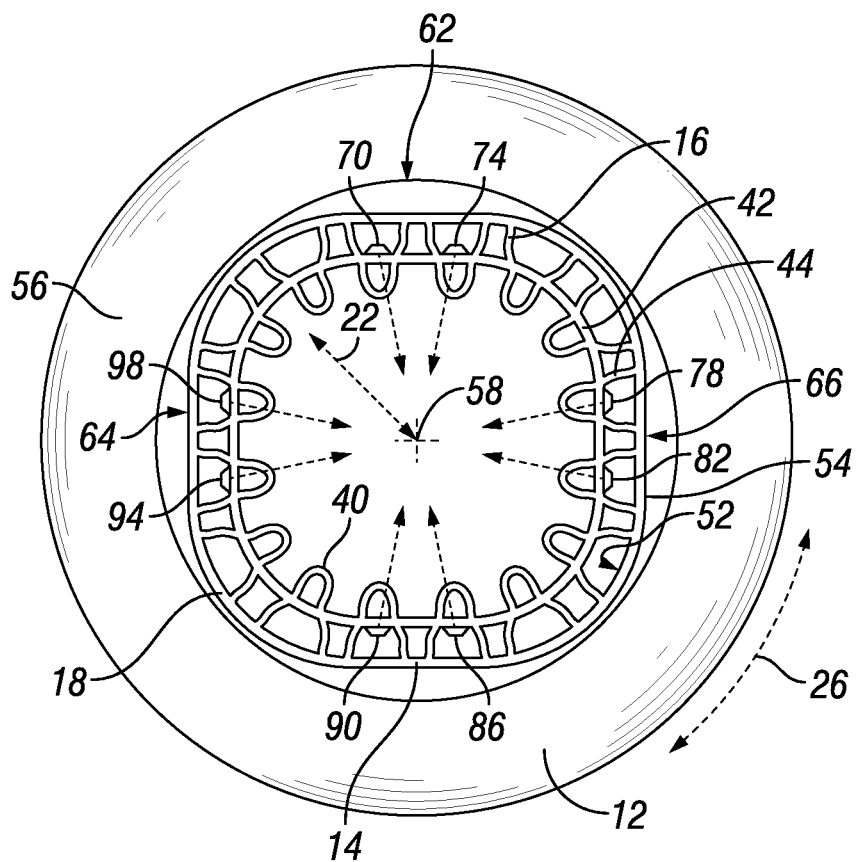
FIG. 10 is a side elevation view of the intermediate section of FIG. 9 inserted into an outer shear band ring.

The next step in the assembly process is the insertion of the intermediate section 14 in the collapsed state 64 into the outer shear band ring 12 as shown in FIG. 10. The forces from the gripping members 70, 74, 78, 82, 86, 90, 94 and 98 may still be applied as the compression device 68 is moved to position the intermediate section 14 inside of the inner diameter of the outer shear band ring 12. Alternatively, the outer shear band ring 12 can be moved over the intermediate section 14 while the compression device 68 remains stationary. No portion of the outer surface 66 may engage the outer shear band ring 12 during this insertion and positioning. The intermediate section 14 may be inserted without experiencing any interference with the outer shear band ring 12. The central axis 58 of the compression device 68 can be coaxial with the central axis 58 of the outer shear band ring 12. If the intermediate section 14 were put into the collapsed state 64 so that some but not all of the outer surface 66 is moved closer to the central axis 58, the compression device 68 and the outer shear band ring 12 may not be coaxial with one another. Here, the intermediate section 14 may be inserted within the outer shear band ring 12 so as to be offset some amount therefrom so that engagement between the outer surface 66 and the inner surface of the outer shear band ring 12 does not occur. The compression of the intermediate section 14 is performed so that nothing engages the outer surface 66 to effect this compression. Instead, the intermediate section 14 is engaged by the mechanism of compression only at locations radially inwards from the outer surface 66 in the radial direction 22.

Figure 11:
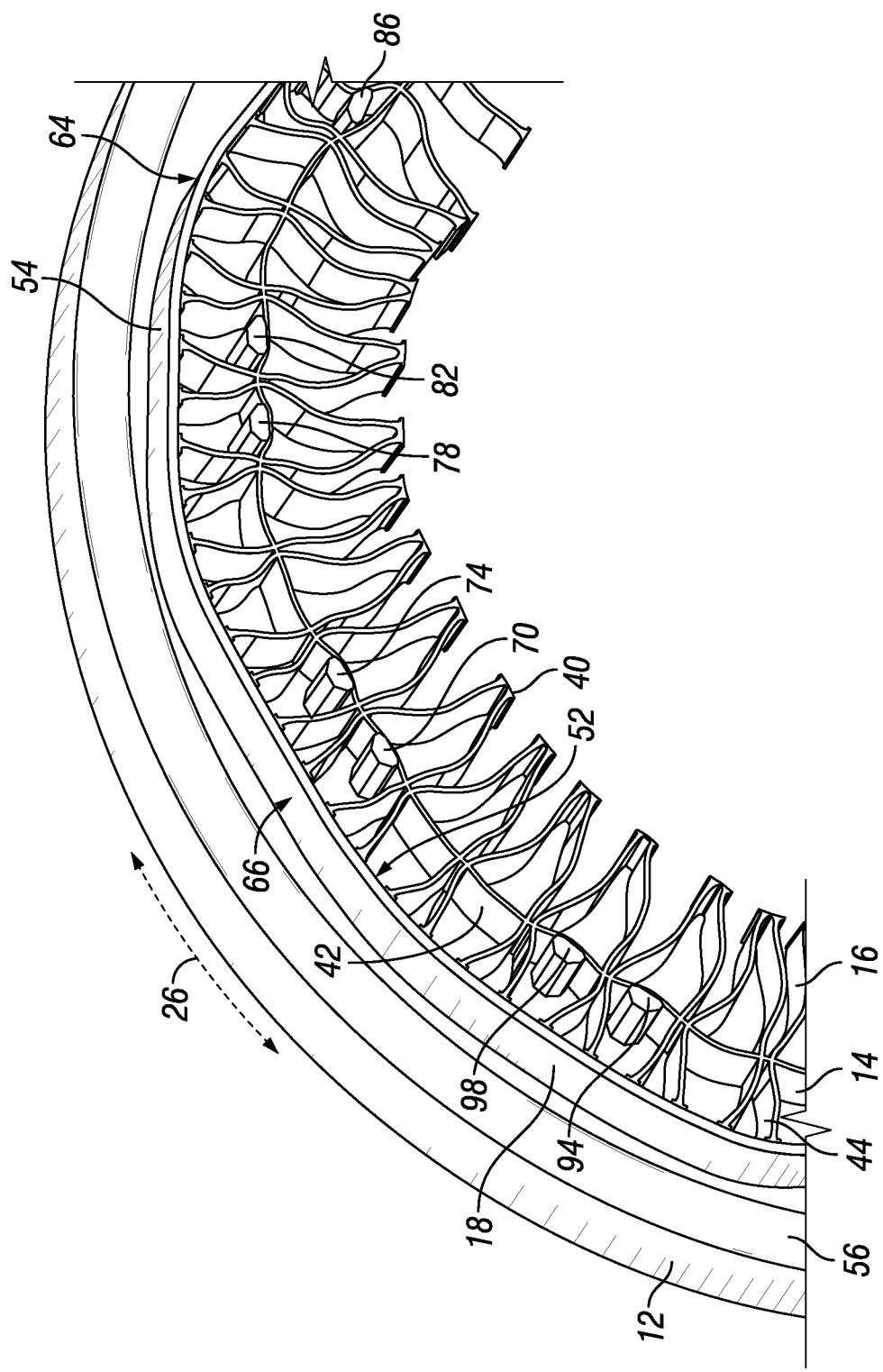
FIG. 11 is a perspective view of a portion of an intermediate section that is collapsed by a plurality of gripping members of a compression device.

FIG. 11 shows an alternate arrangement of a portion of the intermediate section 14 in the collapsed state 64 positioned within the outer shear band ring 12. The outer surface 66 is collapsed in a non-symmetrical manner so that portions of the outer surface 66 are closer to the outer shear band ring 12 than other portions of the outer surface 66. The outer surface 66 in the collapsed state 64 may be described as "undulating" in that may be wavy moving both towards and away from the central axis 58 in the radial direction 22 all the way around the central axis 58 in the circumferential direction 26. The outer surface 66 may be symmetrical in the radial direction 22 in the collapsed state 64, or may be non-symmetrical. When symmetrical, portions of the outer surface 66 are farther in the radial direction 22 than other portions of the outer surface 66 from the central axis 58, but it may be symmetrical in that these various portions are symmetrically disposed about the circumferential direction 26. The gripping members 94, 98, 70, 74, 78, 82 and 86 again engage the outer surface of the interface ring 42. The gripping members 94, 98, 70, 74, 78, 82 and 86 are again divided from one another by pockets of the outer V pair spoke section 44 so that they do not directly face sequential gripping members in the circumferential direction 26.

The intermediate section 14 may not allow direct compression in the radial direction 22. In this regard, the force applied by the gripping members 70, 74, 78, 82, 86, 90, 94 and 98 are not all of the same magnitude directly towards the central axis 58 in the radial direction 22. A greater amount of force may be exerted at certain arc length portions of the intermediate section 14 than at other arc length portions. For example, a larger amount of force could be exerted over a 90 degree portion of the circumference of the intermediate section 14 than the remaining 270 degree portion of the intermediate section 14. By applying force in an unequal manner about various positions around the central axis 58, the intermediate section 14 collapses in a specific manner and can be collapsed so that the entire outer surface 66 moves towards the central axis 58, but certain portions of the outer surface 66 move closer in the radial direction 22 than other portions of the outer surface 66.

Figure 12:
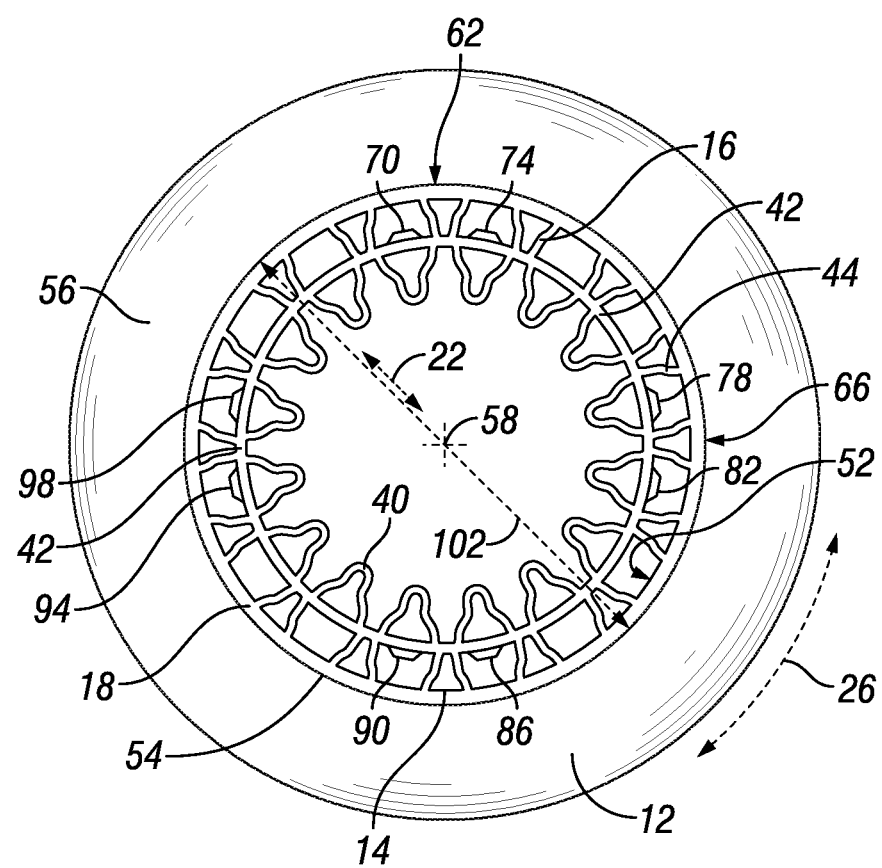
FIG. 12 is a side elevation view of the intermediate section of FIG. 10 inside of the outer shear band ring and released back into the uncollapsed state.

With reference to FIG. 12, the intermediate section 14 of FIG. 10 is shown. Here, compressive forces of the gripping members 70, 74, 78, 82, 86, 90, 94 and 98 are released so that the intermediate section 14 is moved out of the collapsed state 64 of FIG. 10. The gripping members 70, 74, 78, 82, 86, 90, 94 and 98 may all be moved outward in the radial direction 22 simultaneously, or at different times to cause the intermediate section 14 to expand. The intermediate section 14 moves in the radial direction 22 back into its uncollapsed state 62 as previously described. In the uncollapsed state 62, the adhesive interface 54 may be pressed against the outer surface 66 and the outer shear band ring 12. There may be little to no relative motion between the intermediate section 14 and the outer shear band ring 12 after this initial contact upon release. This lack of motion allows for accurate placement of the intermediate section 14 with respect to the outer shear band ring 12, and dislocation of the adhesive of the adhesive interface 54 is prevented. The outer surface 66 assumes the outer diameter in the uncollapsed state 102. The adhesive interface 54 may be a connection that needs to be chemically or thermally cured in order to obtain a permanent connection between the intermediate section 14 and the outer shear band ring 12. The outer shear band ring 12 may thus be cured to the inner shear band ring 18 if one is present in the intermediate section 14. This curing could take place at this point in the process.

Figure 13:
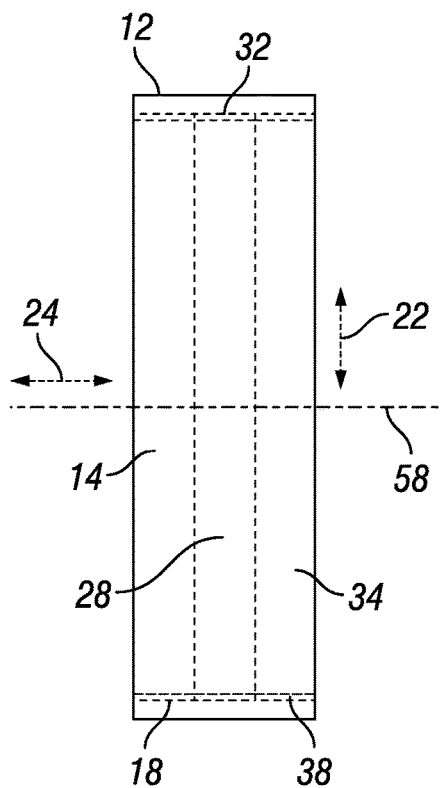
FIG. 13 is a front view of three intermediate sections inserted into an outer shear band ring.

The second and third intermediate sections 28 and 34 can likewise be collapsed, inserted, and expanded to return to their uncollapsed state into the outer shear band ring 12. FIG. 13 shows the positioning of the second and third intermediate sections 28 and 34 into the outer shear band ring 12. The second intermediate section 28 engages both the first intermediate section 14 and the third intermediate section 34, and the first and third intermediate sections 14 and 34 are located at the axial ends of the outer shear band ring 12. The three intermediate sections 14, 28 and 34 when inserted extend along the entire width of the outer shear band ring 12 in the axial direction 24.

All the other intermediate sections 14, 28 and 34 can be collapsed, inserted and expanded at the same time, or they may be individually collapsed, inserted and expanded one after the other. In one embodiment, all three of the intermediate sections 14, 28 and 34 are carried by the compression device 68 and the gripping members 70, 74, 78, 82, 86, 90, 94 and 98 are all moved inward to simultaneously compress the intermediate sections 14, 28 and 34. The three collapsed sections 14, 28 and 34 can then be inserted into the outer shear band ring 12 and then released so that they expand at the same time back into their uncollapsed states. The FIG. 13 arrangement would then be realized in this manner. The features of the intermediate sections 14, 28 and 34 can be arranged so that they are in register with one another, or they may be offset such that features such as spokes of the various intermediate sections 14, 28 and 34 are not aligned with one another in the axial direction 24.

Another method of assembly involves compression of the first intermediate section 14 and insertion into the outer shear band ring 12 and subsequent release into the uncollapsed state 62. After the first intermediate section 14 is released into the uncollapsed state 62, the second intermediate section 28 can then be collapsed by the compression device 68 and inserted into the outer shear band ring 12. The second intermediate section 28 may then be released so that it can expand within the outer shear band ring 12. After this expansion, the third intermediate section 34 may then be collapsed by the compression device 68, inserted, and then subsequently released within the outer shear band ring 12. As such, the intermediate sections 14, 28 and 34 can be inserted and assembled one by one in order within the outer shear band ring 12. The intermediate sections 14, 28 and 34 may all be cured at the point when they are assembled into the outer shear band ring 12.

Once the intermediate sections 14, 28 and 34 are positioned within the outer shear band ring 12 regardless of whether it is simultaneous or one after the other, the adhesive interface 54 can be treated based upon the particular type of adhesive employed. The adhesive interface 54 can be cured by being treated with temperature, pressure and time sufficient to attain optimal curing as per the type of material used in the adhesive interface 54.

Figure 14:
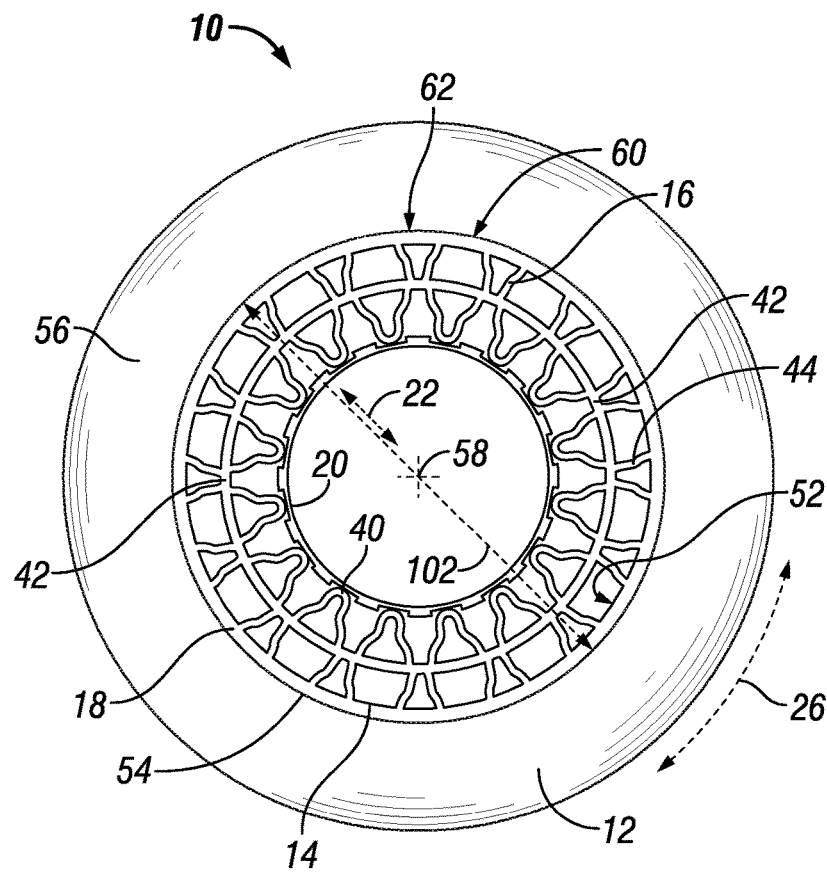
FIG. 14 is a side elevation view of a hub attached to an intermediate section that is disposed within an outer shear band ring.

The next step in the assembly process may involve the attachment of the hub 20 to the intermediate section 14, and any other intermediate sections 28 and 34 present. Attachment of the hub 20 is shown in FIG. 14. The various gripping members 70, 74, 78, 82, 86, 90, 94 and 98 of the compression device 68 may be withdrawn right before the hub 20 attachment, or could be left in place in certain exemplary embodiments. If the adhesive interface 54 is an interface that requires curing, and if the adhesive interface 54 has not been cured before the attachment of the hub 20, the adhesive interface 54 may be attached at this point in the assembly.

The outer shear band ring 12 can include a series of reinforcements, and the various inner shear band rings 18, 32 and 38 may likewise include a series of reinforcements. The shear band rings 12, 18, 32 and 38 are all part of the shear band 56 and are not portions of the outer V pair spoke sections of the supporting structures 16, 30 and 36. The assembly described herein may thus feature the shear band 56 being provided as multiple parts that are subsequently assembled with one another into the resulting shear band 56. The inner shear band rings 18, 32 and 38 may not be rings that are of the same material as the outer V pair spoke sections 44 of the supporting structures 16, 30 and 36, but may instead be actual portions of the completed shear band ring 56.

The features of the intermediate sections 14, 28 and 34 may be out of register from one another. In this regard, the second intermediate section 28 is rotated relative to the first and third intermediate sections 14 and 34 in the circumferential direction 26 so that the spokes of the second intermediate section 28 are not aligned with the spokes of the first and third intermediate sections 14 and 34. The supporting structures 16 and 36 are in register with one another so that the spokes of the first and third intermediate sections 14 and 34 align in the circumferential direction 26. However, it is to be understood that the non-pneumatic tire 10 can be arranged in other manners so that all of the features of the sections 14, 28 and 34 such as the spoke are all aligned with one another in the circumferential direction 26 so that they are aligned end to end in the axial direction 24 so that from the side the first intermediate section 14 hides all of the features of the second and third intermediate sections 28 and 34.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method of forming a non-pneumatic tire comprising the steps of:
   providing an outer shear band ring;
   providing an intermediate section that has a supporting structure, wherein the intermediate section is in an uncollapsed state;
   compressing the intermediate section from the uncollapsed state to a collapsed state;
   inserting the intermediate section when in the collapsed state inside of the outer shear band ring such that the outer shear band ring is located outward from the intermediate section in a radial direction of the tire; and releasing compression of the intermediate section when the intermediate section is inside of the outer shear band ring such that the intermediate section returns to the uncollapsed state from the collapsed state;

wherein the intermediate section has an outer surface that is uninterrupted and has a constant outer diameter 360 degrees about a central axis of the intermediate section, wherein the outer diameter of the outer surface is the same both in the uncollapsed state outside of the intermediate section and when inside of the intermediate section after releasing compression.

2. The method as set forth in claim 1, wherein in the collapsed state the entire outer surface is located closer to the central axis of the intermediate section in the radial direction than the outer diameter of the intermediate section when in the uncollapsed state.

3. The method as set forth in claim 1, wherein the intermediate section has an inner shear band ring, wherein the outer surface of the intermediate section is located at the outer surface of the inner shear band ring and further comprising the step of attaching the inner shear band ring to the outer shear band ring.

4. The method as set forth in claim 3, wherein an adhesive interface is present between the inner shear band ring and the outer shear band ring, wherein the adhesive interface is cushion gum, wherein the attaching step includes thermally curing the adhesive interface in order to effect a permanent attachment between the inner shear band ring and the outer shear band ring.

5. The method as set forth in claim 3, wherein the step of providing the intermediate section includes placing the inner shear band ring into an injection mold for the supporting structure, wherein the supporting structure is formed by injection molding the supporting structure to an inner surface of the inner shear band ring.

6. The method as set forth in claim 3, wherein a shear band ring is formed by the inner shear band ring and the outer shear band ring; and wherein the inner shear band ring includes two layers.

7. The method as set forth in claim 3, wherein the intermediate section is a first intermediate section, and wherein the supporting structure is a first supporting structure, and wherein the inner shear band ring is a first inner shear band ring; and further comprising the steps of:

providing a second intermediate section that has a second supporting structure and a second inner shear band ring;

providing a third intermediate section that has a third supporting structure and a third inner shear band ring;

compressing the second intermediate section;

compressing the third intermediate section;

inserting the second intermediate section inside of the outer shear band ring while the second intermediate section is collapsed, wherein the first intermediate section is located next to the second intermediate section in an axial direction of the tire;

releasing compression of the second intermediate section when the second intermediate section is inside of the outer shear band ring;

inserting the third intermediate section inside of the outer shear band ring while the third intermediate section is collapsed, wherein the third intermediate section is located next to the second intermediate section in the axial direction of the tire; and releasing compression of the third intermediate section when the third intermediate section is inside of the outer shear band ring.

8. The method as set forth in claim 7, wherein the step of inserting the first intermediate section and the step of releasing compression of the first intermediate section are both performed before the step of releasing compression of the second intermediate section; and wherein the step of releasing compression of the third intermediate section is performed after the step of releasing compression of the second intermediate section.

9. The method as set forth in claim 7, wherein the steps of releasing compression of the first intermediate section, releasing compression of the second intermediate section, and releasing compression of the third intermediate section are all performed at the same time.

10. The method as set forth in claim 1, wherein the supporting structure has an inner V pair spoke section and an interface ring, wherein the interface ring is located outward from the inner V pair spoke section in the radial direction, wherein the supporting structure has an outer V pair spoke section located outward from the interface ring in the radial direction.

11. The method as set forth in claim 10, wherein the compressing step of the intermediate section is performed by a compression device that has a plurality of gripping members that engage the interface ring, wherein the plurality of gripping members move inward in the radial direction to effect the compression of the intermediate section to the collapsed state, wherein the plurality of gripping members move outward in the radial direction to effect the releasing of compression of the intermediate section to return the intermediate section to the uncollapsed state from the collapsed state.

12. The method as set forth in claim 11, wherein the plurality of gripping members that engage the interface ring are located inward from the outer surface of the intermediate section in the radial direction when the intermediate section is in the uncollapsed state and when the intermediate section is in the collapsed state.

13. The method as set forth in claim 1, wherein the compressing step is performed by a compression device that has a plurality of gripping members that engage the intermediate section and that move inward in the radial direction to effect the compression of the intermediate section to the collapsed state;

wherein the releasing compression step is performed by the plurality of gripping members moving outward in the radial direction to return the intermediate section to the uncollapsed state, and wherein the intermediate section is inextensible when in the uncollapsed state.

14. A method of forming a non-pneumatic tire comprising the steps of:

providing an outer shear band ring;

providing an intermediate section that has a supporting structure, wherein the intermediate section is in an uncollapsed state;

compressing the intermediate section from the uncollapsed state to a collapsed state;

inserting the intermediate section when in the collapsed state inside of the outer shear band ring such that the outer shear band ring is located outward from the intermediate section in a radial direction of the tire; and releasing compression of the intermediate section when the intermediate section is inside of the outer shear band ring such that the intermediate section returns to the uncollapsed state from the collapsed state;

wherein the intermediate section has an outer surface that is located at an outer diameter of the intermediate section in the uncollapsed state, wherein in the collapsed state a portion of the outer surface but not all of the outer surface is located closer to a central axis of the intermediate section in the radial direction than the outer diameter of the intermediate section when in the uncollapsed state.

15. A method of forming a non-pneumatic tire comprising the steps of:

providing an outer shear band ring;

providing an intermediate section that has a supporting structure, wherein the intermediate section is in an uncollapsed state;

compressing the intermediate section from the uncollapsed state to a collapsed state;

inserting the intermediate section when in the collapsed state inside of the outer shear band ring such that the outer shear band ring is located outward from the intermediate section in a radial direction of the tire;

releasing compression of the intermediate section when the intermediate section is inside of the outer shear band ring such that the intermediate section returns to the uncollapsed state from the collapsed state;

providing a hub; and positioning the hub inside of the intermediate section such that the intermediate section is located outward from the hub in the radial direction, wherein the positioning of the hub step is performed after the step of releasing compression of the intermediate section.

16. A method of forming a non-pneumatic tire comprising the steps of:

providing an outer shear band ring;

providing an intermediate section that has a supporting structure, wherein the intermediate section is in an uncollapsed state, wherein the intermediate section has an outer surface;

compressing the intermediate section from the uncollapsed state to a collapsed state by grasping the intermediate section at a location inward in a radial direction from the outer surface of the intermediate section;

wherein a compression device that has gripping members that move in the radial direction are inserted within the intermediate section and then moved radially inward to cause compression of the intermediate section from the uncollapsed state to the collapsed state;

inserting the intermediate section when in the collapsed state inside of the outer shear band ring such that the outer shear band ring is located outward from the intermediate section in a radial direction of the tire; and releasing compression of the intermediate section when the intermediate section is inside of the outer shear band ring such that the intermediate section returns to the uncollapsed state from the collapsed state, wherein the gripping members are removed from the intermediate section such that no portion of the compression member is left in the intermediate section after releasing of the compression of the intermediate section;

wherein the intermediate section has an outer surface that is uninterrupted and has a constant outer diameter 360 degrees about a central axis of the intermediate section, wherein the outer diameter of the outer surface is the same both in the uncollapsed state outside of the intermediate section and when inside of the intermediate section after releasing compression.

17. A method of forming a non-pneumatic tire comprising the steps of:

providing an outer shear band ring;

providing an intermediate section that has a supporting structure, wherein the intermediate section is in an uncollapsed state and has an inner end free from engagement with a hub;

compressing the intermediate section from the uncollapsed state to a collapsed state;

inserting the intermediate section when in the collapsed state inside of the outer shear band ring such that the outer shear band ring is located outward from the intermediate section in a radial direction of the tire;

releasing compression of the intermediate section when the intermediate section is inside of the outer shear band ring such that the intermediate section returns to the uncollapsed state from the collapsed state; and providing the hub and positioning the hub inside of the intermediate section such that the intermediate section is located outward from the hub in the radial direction, wherein the positioning of the hub is performed after the step of releasing compression of the intermediate section.

* * * * *